(12) United States Patent
Tu et al.

(10) Patent No.: US 8,221,660 B2
(45) Date of Patent: Jul. 17, 2012

(54) TYPE OF SURFACE-REINFORCED SOLID WOOD SECTION MATERIAL AND ITS MANUFACTURING METHOD

(75) Inventors: Dengyun Tu, Huzhou (CN); Chengfeng Pan, Huzhou (CN); Xin Zhang, Huzhou (CN); Yuezhong Ni, Huzhou (CN); Xueli Yu, Huzhou (CN)

(73) Assignee: Zhejiang Shiyou Timber Co. Ltd., Huzhou, Zhejiang (CN)

( * ) Notice: Subject to any disclaimer, the term of this patent is extended or adjusted under 35 U.S.C. 154(b) by 0 days.

(21) Appl. No.: 13/175,903

(22) Filed: Jul. 4, 2011

(65) Prior Publication Data

US 2011/0262685 A1    Oct. 27, 2011

Related U.S. Application Data

(63) Continuation of application No. PCT/CN2010/070453, filed on Feb. 1, 2010.

(51) Int. Cl.
*C01B 31/00* (2006.01)

(52) U.S. Cl. ............ 264/29.1; 264/319; 144/380

(58) Field of Classification Search ........... 264/29.1, 264/319; 144/380
See application file for complete search history.

(56) References Cited

U.S. PATENT DOCUMENTS 5,992,043 A * 11/1999 Guyonnet ............... 34/382
2005/0241730 A1* 11/2005 Kause ..................... 144/380

FOREIGN PATENT DOCUMENTS

| CN | 101214675 A | 7/2008 |
|---|---|---|
| CN | 101486212 A2 | 7/2009 |
| CN | 201320793 Y | 10/2009 |
| CN | 101570031 A | 11/2009 |
| CN | 101602623 A | 12/2009 |
| EP | 2255937 A1 | 1/2010 |
| JP | 2000238015 A | 9/2000 |
| JP | 2006035792 A | 9/2006 |
| KR | 20030012322 A | 2/2003 |

OTHER PUBLICATIONS

Jiang et al., "Effects of Time and Temperature on the Viscoelastic Properties of Chinese Fir Wood", Drying Technology, 27 1229, Oct. 2009.*
International Search Report for PCT/CN2010/070453, Oct. 8, 2010, State Intellectual Property Office of China.
International Search Report for PCT/CN2010/070515, Sep. 30, 2010, State Intellectual Property Office of China.
U.S. Appl. No. 13/175,970, filed Jul. 5, 2011.

* cited by examiner

*Primary Examiner* — Galen Hauth
(74) *Attorney, Agent, or Firm* — Olive Law Group, PLLC

(57) ABSTRACT

The present invention relates to a solid wood section material and its manufacturing method. This invention is achieved by the following technical plans: a type of surface-reinforced solid wood product, including a compacted layer and a natural layer connected with fibre, has total density of between 350 and 750 kg/m$^3$, moisture content between 5 and 12%, corrosion grade greater than II and weight loss less than or equal to 24%. This invention is particularly suitable to make floor boards.

9 Claims, 3 Drawing Sheets

TYPE OF SURFACE-REINFORCED SOLID WOOD SECTION MATERIAL AND ITS MANUFACTURING METHOD

CROSS-REFERENCE TO RELATED APPLICATIONS

This application is a continuation of PCT application No. CN2010/070453 filed on Feb. 1, 2010, which designates the United States, which also claims priority to Chinese Patent Application No. CN200910156991.1 filed on Dec. 26, 2009, the entire contents of each of which are hereby incorporated by reference.

FIELD OF THE INVENTION

This invention relates to a type of wood section material and its manufacturing method, especially the cork product and its manufacturing method.

BACKGROUND OF THE INVENTION

Along with the exhaustion of natural wood resources and protection of national natural woods, artificial wood will become the main resources for national and international timber markets. Artificial wood includes fir, masson pine, larch, cottonwood and paulownia. They are featured in fast-growing speed, high yield quantity and short harvesting cycle. However, they have limited applications because of some innate defects caused by fast-growing speed such as low wood quality, low density and surface hardness, poor corrosion resistance and climate resistance, and easy to be distorted or cracked.

Wood functions improvement is an effective approach to change physical and chemical characteristics of artificial wood, whose density, surface hardness, corrosion resistance and dimensional stability improve to a large extent after process. Then they can be used for solid wood floor boards, furniture and construction.

One of the methods to improve mechanical property of wood section material is compression.

Many studies have been done on fast-growing trees such as cotton wood, southern pine and masson pine due to their loose texture and large anisotropy and a number of successful domestic and international experiences can be used for reference.

However, the compressed wood rebounds seriously, especially under the conditions of water.

In order to eliminate the defects of the compressed wood, steam or resin is often used to fix the compressed wood to prevent rebound. For example, in 1996, Mrs. Fang Guizhen et al. used melamine-formaldehyde (MF) resin with different concentration of low molecular weight as the cross-linking agent to soak populus ussuriensis with 47% for ASE and 36% for MEE. The samples after processed by cross-linking agent with 10% concentration, compressed and soaked in room temperature, they were able to maintain their shape. It is still applicable to use cross-linking agent with 17.5% and 25% concentration and soak in boiling water. In 1997, Mrs. Fang Gunzhen studied the action mechanism between populus ussuriensis and MF cross-linking agent. In 1998, Mrs. Fang Guizhen et al. used PF performed polymer with different concentration to process populus ussuriensis and compress the populus ussuriensis along its transverse striation in heating process. It was found that the samples after the process of 10% PF performed polymer, ASE reached to 60% and MEE reached to 52%. It is able to maintain the shape no matter it was in room temperature or boiling water. In 1998, Mrs. Fang Guizhen et al. used 1, 2, 3, 4-butanetetracarboxylic acid (BKA) as the cross-linking agent and NaH2PO2 as the accelerant to process populus ussuriensis, which is then compressed under constant temperature 150° C. Mrs. Fang Guizhen et al. used PF resin with different concentration of low molecular weight to process populus ussuriensis to improve its dimensional stability and mechanical strength. In 2000, Mrs. Fang Guizhen et al. conducted a research to use low chromaticity phenolic resin with low molecular weight to soak the wood and use phenolic resin with low molecular weight to improve the property of populus ussuriensis.

The existing surface-compressed solid wood is to soak the surface of the processed wood into the water for five to six hours and use microwave to heat the wood after some amount of water is infiltrated. Then it is compressed on the heating device and dried afterwards to fix the compressed product. However, after the wood is soaked by water, its surface contains large amount of water. When the water vaporizes, the wood surface would quickly contract to produce a large internal stress. Therefore, the surface is easy to crack or even rebounded because the internal stress of the surface is not balanced and fully solidified in the process of compression and drying.

Because the above method uses chemical agent to process the wood, it is inevitable to produce water gas/water and noise. The finished product has poor dimensional stability/corrosion resistance/climate resistance, low service life/yield quantity and easy to be distorted or cracked.

Chinese patent document (CN101603623A) publicized the patent of "a type of surface-reinforced solid wood section material/floor board and their manufacturing method". The manufacturing method includes: (1) dry the log; (2) compress the log in a hot-press with temperature from 210 to 250° C.; (3) maintain the temperature of the compressed log for 20 to 60 minutes; and (4) control the moisture content of the log within 6 to 9%. However, the wood is easy to shrink and crack in drying by using above process with large wood consumption, low yield quantity (60% to 70%), dark color and burning smell. The finished floor boards can only be used in northern China because of the dry weather. In southern China, the boards would be distorted with low corrosion resistance (grade III) and poor anti-corrosion ability.

Chinese patent document (CN101214675A) publicized the patent of "Wood Reinforcement Method by Hot-pressed Carbonization", in which (1) dry the wood in a drying kiln according to its density and control the moisture content within 3 to 17%; (2) polish the wood; (3) Put the polished wood in a hot-press with temperature from 160 to 260° C. for carbonization. Control the compression ratio within 5 to 50% and maintain the temperature for 10 to 240 minutes; cool the carbonized wood to below 80%; (4) place the wood in natural environment or a temperature & humidity test chamber and control the moisture content in 5 to 10% according to the purpose of the wood. By using above method, the wood is easy to be cracked during the carbonization process with low yield quantity (50% to 60%), low corrosion resistance (below grade III), poor dimensional stability. Meanwhile the color of the wood would become darker due to excessive carbonization with burning smell.

Chinese patent document (CN101486212A) publicized the patent of "Manufacturing Method of Carbonized Three-layer Solid Laminated Floor Board (cottonwood)". The preparation of the surface material includes: cut cottonwood into panels and process them into thin boards according to compression ratio (30%, 40%, 50% and 60%) with thickness from 2-4 mm and moisture content from 20 to 40% after drying and polishing. Compress the boards in a press and use the pressure based on the required compression ratio under 70 to 110° C. Carbonize the compressed boards with certain pressure or in a dedicated clamp under 190 to 220° C. for 1.5-5 hours. As the carbonization device does not have ventilation, cool the thin boards to 40 to 60° C. under certain pressure after carbonization. Take out the boards and use wide-belt sander to remove the outer surface with dark color. The thickness of the finished boards would be at 2 to 4 mm. By using above method, because of large moisture content of cottonwood (at saturation point of fiber), the shrinkage ratio and surplus stress would be large under 70-110° C. and the wood is easy to crack during the carbonization under 190 to 220° C. As the compression ratio is big, the wood will be compressed in a whole piece, therefore the wood consumption becomes large. The ventilation holes in carbonization device will make the surface of the wood having uneven points. After polishing, the hardness of the boards where those points are present will decrease. If there is no moisture content adjustment treatment, the wood will be distorted if it absorbs humidity. Consequently such process is not good enough to be widely applied.

SUMMARY OF THE INVENTION

The present invention resolves the above technical problems and provides a solid wood section material with low density, high surface hardness, high anticorrosion grade (above grade II), stable moisture content, and suitable for various weather conditions.

The technology employed in this invention is achieved by the following means:

A type of surface-reinforced solid wood section material includes a compacted layer and a fiber connected natural layer with total density of 350-750 kg/m$^3$, moisture content 5 to 12%, anticorrosion degrade greater than II and weight loss less than or equal to 24%.

The above product has no viscose. The natural layer is the original wood structure without compression. The structure may be affected during the compression, but it can be ignored compare with the compacted layer. The density of the said compact layer reduces gradually from the surface to 0.6 to 4 mm from the other surface. The compacted layer and the natural layer are connected by fiber, which is different from existing plywood. The above connection is firm, environmental friendly and easy to operate. The surface paint film hardness of the compacted layer can reach to 3 to 6H.

The material used in this invention is soft wood, whose air-dry density is below 700 kg/m$^3$ and most of them are fast-growing timber.

Moisture content of solid wood section material is 5 to 12%. Moisture content indicates water weight in the wood and wood weight percentage after drying. Moisture absorption equilibrium moisture content under atmospheric condition indicates the stable moisture absorption moisture content achieved eventually under certain temperature/humidity conditions. Generally speaking, the moisture content of wood is different in places. For example, the average equilibrium moisture content in Guangzhou is 15.1% while in Beijing it is 11.4%. Wood dried to 11% is usable in Beijing but in Guangzhou it would expand and distort after absorbing moisture. Therefore, In order to guarantee the stability of the wood section material, the final moisture content should be close to or the same as the equilibrium moisture content. In this invention, after carbonization, it not only increases the surface hardness of the wood and achieves a better fixation but largely decreases its hygroscopicity and minimizes the influence on dimensional stability due to temperature/humidity change in different seasons. The product service life is then prolonged, its moisture content needs not to be adjusted under different weather conditions and can be used in various regions and weather.

The surface hardness of the surface-reinforced solid wood section material in this invention is above 1500N (2.0 times of its natural layer) according to GB1941-91-Wood Hardness Test Method. Meanwhile, the equilibrium moisture content is largely lower than the compressed wood made with existing technology. In actual application the product's moisture content fluctuate in a low level and dimensional stability improves noticeably. Since the compacted layer of current compressed wood needs to be sealed off, a large number of chemicals are required as a result, but the product of this invention does not contain the above chemicals. Moreover, as anticorrosion performance of surface-reinforced solid wood section material is excellent, a test is conducted on carefully selected wood samples according to GB/T13942.1-1992-Wood Natural Durability and Corrosion Resistance Test Method, it is found that the corrosion resistance grade is >II and weight loss ≦24%.

Raw materials of the above surface-reinforced solid wood section material are fast growing timber such as fir, masson pine, larch, cottonwood and paulownia. Before they are processed, their mechanical property, corrosion resistance, moisture proof and stability are poor and they are easy to be invaded by insects and easy to crack.

As preferred the corrosion resistance grade should be above I.

As preferred the compacted layer thickness should be 1 to 2 mm.

As preferred the moisture content should be 6.5 to 10% and 7 to 9% would be more preferred.

As preferred the compacted layer thickness should be 0.6 to 4 mm and the density of compacted layer should be 1.3 to 3 times of that for natural layer.

As preferred for above proposal, the solid wood is cottonwood with total density of 380 to 550 kg/m$^3$, moisture content 6 to 12%, thickness of compacted layer 0.6 to 4 mm and density of compacted layer is 1.5 to 3 times of that for natural layer.

As preferred for above proposal, the solid wood is southern pine with total density of 500 to 720 kg/m$^3$, moisture content 5 to 11%, thickness of compacted layer 0.6 to 3 mm and density of compacted layer is 1.3 to 2 times of that for natural layer.

As preferred for above proposal, the solid wood is masson pine with total density of 480 to 680 kg/m$^3$, moisture content 5 to 10%, thickness of compacted layer 0.6 to 2.5 mm and density of compacted layer is 1.3 to 2 times of that for natural layer.

Advantages of surface-reinforced solid wood section material:

(1) Thickness and density distribution: thickness of compacted layer is 0.6 to 4 mm, and density of compacted layer is 1.3 to 3 times of that for natural layer;

(2) Hygroscopicity: 45% lower compare with source material; and (3) Dimensional stability: 55% higher compare with its source material.

The manufacturing method for surface-reinforced solid wood section material provided in this invention uses wood physical function improvement method to resolve some technical problems of fast-growing timber such as softness, small density and easy to crack and distort. It also resolves some technical problems of compressed wood such as large wood consumption, pollution caused by soaked resin, poor dimensional stability/corrosion resistance/climate resistance, distortability, low yield quantity, complicated production procedure and high energy consumption.

The manufacturing method of the surface-reinforced solid wood section material includes the following steps:

(1) Drying: dry the wood with airdry density lower than 700 Kg/m³ to the one with moisture content at 5 to 12%;

(2) Compression: compress the surface of the wood;

(3) Carbonization: carbonize the wood.

As preferred the high temperature/humidity drying method is used in the said drying stage. It is helpful to prevent the wood from shrinking, going moldy or creating blue stain during the drying stage. The quality is guaranteed and the moisture content reduces to 5 to 12%. Another preferred option is to air dry the wood in a room for 5 days and then dry it. It can prevent the wood from cracking during the drying stage.

As preferred, dry the wood with resin until its moisture content drops to 8 to 12% and dry the wood without resin until its moisture content drops to 5 to 8%. Because the wood would become crispy for the wood with moisture content of 3 to 5%, it is easy to crack during the compression and carbonization stage. If the moisture content reaches to 20 to 40%, as the moisture will become water vapor during the carbonization process, if the moisture content is high, the overheated water vapor in the wood will generate high pressure. Since the wood has small density and fast-growing speed during compression and carbonization stage, then such pressure is easy to exceed the strength of the inner fiber leading to the crack. The experience proves when the wood is processed by means of above procedure, its yield quantity can reach to as high as 98% or above.

Hot press is applied in the above compression stage. As the upper plate and lower plate of the hot press has temperature difference, the wood surface will become soft. If the pressure of the hot press is controlled to 25 to 50 Mpa (30 to 40 Mpa is more preferable), only 1 to 5 mm of the wood surface is pressed. Lower the temperature of the upper/lower plates with preferred temperature difference lower than 30° C. (the same temperature is more preferred) after compression. Maintain the temperature and pressure for 30 to 120 min (30 to 90 min is preferred and 45 to 90 min is more preferred). The wood surface will form a compacted layer with 0.6 to 4 mm; the density of the compacted layer is 1.3 to 3 times of that for the natural layer.

As a further preferred option, the compression procedure is to control the pressing speed at 0.5 to 4.0 mm/s and compression ratio at 10 to 25%.

As preferred for above technology, the temperature of the hot press should be controlled at 140 to 200° C. and the low temperature plate is at least 100° C. below the high temperature plate. As a further preferred option, the high temperature plate of the hot press is controlled at 150 to 170° C.

As preferred the carbonization process is conducted for 1 to 5 hours at 170 to 230° C. and 3 to 5 hours at 190 to 210° C. is more preferred. If the wood is carbonized for 1 to 3 hours at 170 to 190° C., the pressed part would be fully plastified. Release the internal stress created during the compression, cool the wood and adjust the moisture content to 5 to 12% to meet the requirement of moisture content.

As preferred the carbonization stage also include a pre-carbonization stage, which the wood is pre-carbonized for 1-4 hours at 125-150° C. and 2-4 hours at 125-135° C. is more preferred. Another option is 1-3 hours at 130-150° C.

As preferred it also includes a step to adjust the moisture content to 5 to 12% after carbonization.

As a further preferred option for above proposal, a carbonization kiln with normal pressure is used in carbonization stage. Carbonize the wood for 1 to 5 hours at 170 to 230° C. and 3 to 5 hours at 190 to 210° C. is more preferred; the moisture content is 5 to 12% after heat process.

As a further preferred option for above proposal, pre-carbonization stage is necessary before carbonization in the carbonization kiln. In other words, pre-carbonize the wood for 1 to 4 hours at 125 to 150° C. and 2 to 4 hours at 125 to 135° C. is more preferred. It is helpful for the wood to prevent defect during the carbonization stage.

As preferred a carbonization jar is used in carbonization stage with internal pressure at 0.15 to 0.6 MPa. Carbonize the wood for 1 to 5 hours at 170 to 230° C. and 1 to 3 hours at 170 to 190° C. is more preferred. Adjust the moisture content to 5 to 12% after heat process.

As preferred the pre-carbonization stage is necessary before carbonization in the carbonization jar. In other words, pre-carbonize the wood for 1 to 4 hours at 125 to 150° C. and 1 to 3 hours at 135 to 150° C. is more preferred. It is helpful for the compacted layer to be shaped to ensure the dimensional stability of the finished product.

As preferred in this invention, it also includes a painting stage (with pressure roller) after carbonization, which it is to press the UV resin into compacted layer for 0.05 to 0.15 mm under the pressure of 0.5 to 1.0 Mpa. It is helpful for the paint to fully contact with wood fibre to create the solidification reaction. Consequently the paint film is both hard and soft and the various performance of the compressed wood is improved.

In conclusion, the present invention has the following positive effects:

1. The surface-reinforced solid wood section material can use fast-growing timber. Such timber is resourceful and low in price. After compression and carbonization, its surface will have the microenvironment property and excellent mechanical property as natural and fine wood from valuable trees. This invention uses physical property improvement technology for combined type wood taking shape at a time. That is the finished product is directly produced after carbonization. It reduces many stages such as soaking with adhesive. It is also economical and improves the mechanical property and maintains the natural property of the wood;

2. The equilibrium moisture content of the surface-reinforced solid wood section material fluctuates in a low level. The product also has high dimensional stability, strong corrosion resistance and climate resistance. The moisture content of the product needs not to be adjusted and it can be placed in different environmental conditions such as outdoor or indoor with underground heat;

3. The compacted layer of the surface-reinforced solid wood section material connects with the fibre of natural layer. They do not have the problem such as gluing and separation. After carbonization and when compacted layer is fixed, the wood will have a new property—hard on surface and soft in bottom. It is suitable to be used for solid wood floor boards, which are beautiful, comfortable and no dangerous gas, especially for household having baby and the elderly. Normal solid wood floor boards cannot compare with them;

4. The manufacturing method of the surface-reinforced solid wood section material ensures that the small rebound and mechanical property of the product. The color of the product can be changed from yellow to brown by controlling the temperature and time of carbonization. In this way, the wood will looks more elegant. The carbonization method is quite different from the existing method. It is independently developed without changing original wood property. It has a short processing time and the finished product looks beautiful. If using this method to replace the existing carbonization method, all carbonized wood would have cracks on the surface or inside. This method is more energy saving;

5. Drying before compression method adopted in the manufacture of the surface-reinforced solid wood section material is helpful to prevent wood from going moldy or creating blue stain or damaging the wood appearance. It is also helpful to prevent wood from cracking during follow-up compression to damage machines or cause human injure. Hence the wood yield quantity and quality is improved;

6. The manufacturing method used in the surface-reinforced solid wood section material is simple and suitable for mass production. The key stage involved in this invention is wood drying, compression and carbonization. So long as these steps are properly followed, a high quality product can be developed;

7. The manufacturing method used in the surface-reinforced solid wood section material is to press the UV solidified resin into the compacted layer of the wood to form the permanent solidification. In other words, the compacted layer is permanently sealed off. It effectively reduces the moisture absorption capability of the wood and further enhances the wood dimensional stability to avoid rebound; and 8. The process used for the surface-reinforced solid wood section material is simple. No chemical agent is required during carbonization stage after compression without discharging waste water and gas. As thermal utilization factor is high and it is environmentally friendly, it is effectively to overcome the inherent defects of wood. It solves the complicated problem that cannot be addressed by current technology, that is, to protect the environment while resolving the rebound problem. It is helpful for the implementation of industrialization.

BRIEF DESCRIPTION OF THE DRAWINGS

FIG. 1 and FIG. 2 respectively show the image of slitting electric mirror for finished product and cottonwood source material, in which the source material in FIG. 2 has even cellular structure and in FIG. 1, it shows that the density of compacted layer, 2 to 3 mm from the surface, can be noticeably observed and further down it has the even cellular structure.

FIG. 3 and FIG. 4 respectively show the density distribution of the source material and finished product with 3 samples for each experiment. It is found that the surface after compression process has enhanced density 2 to 3 mm from the surface.

DESCRIPTION OF THE PREFERRED EMBODIMENT

Embodiment 1

Figure 1:
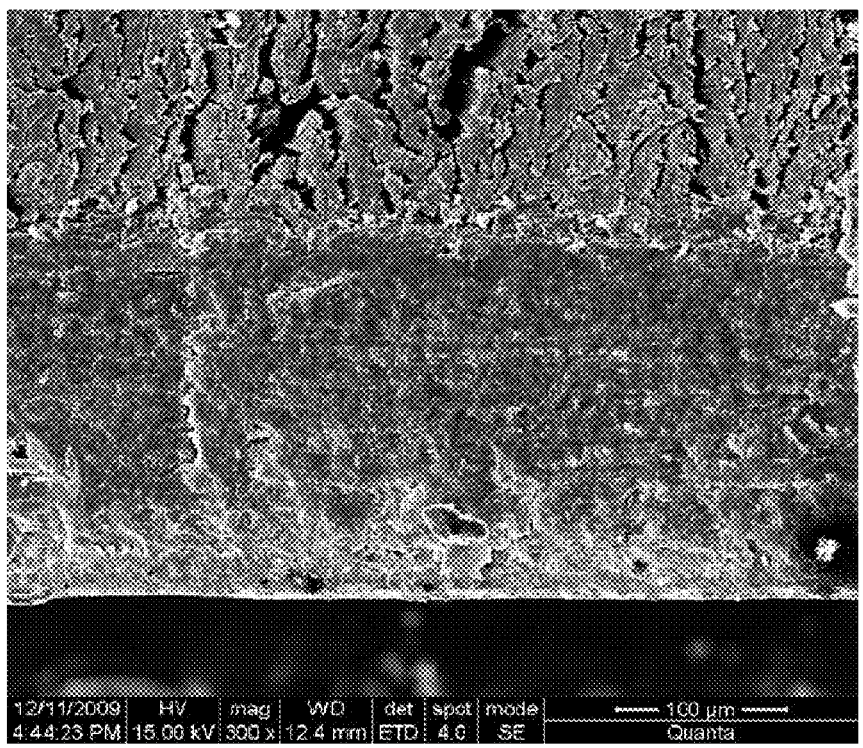
FIG. 1 shows the image of slitting electric mirror for cottonwood compression and carbonization described in embodiment 2.
Figure 2:
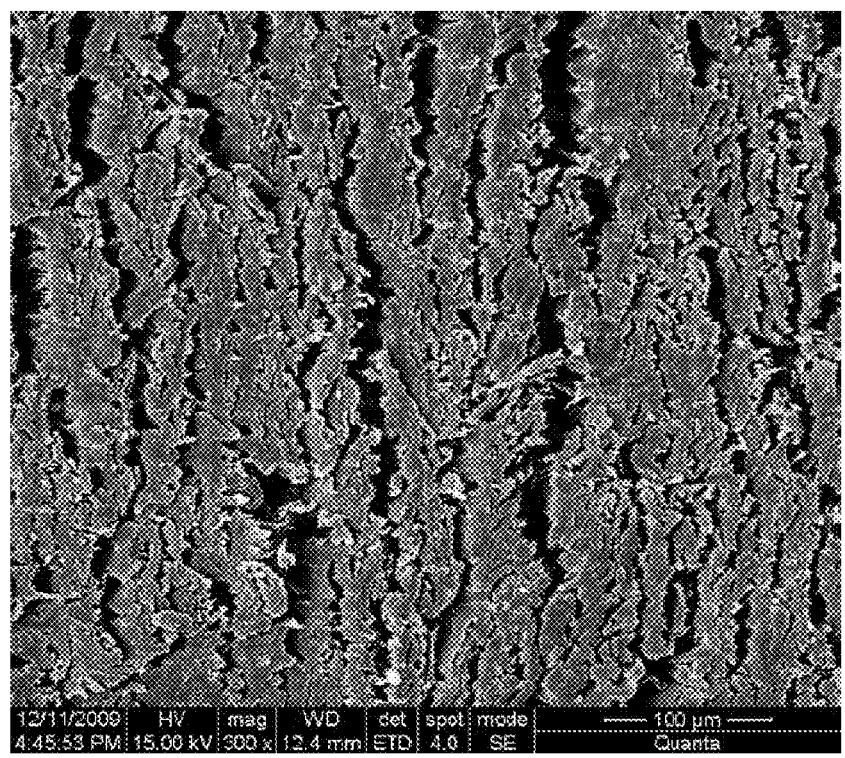
FIG. 2 shows the image of slitting electric mirror for cottonwood source material described in embodiment 2.
Figure 3:
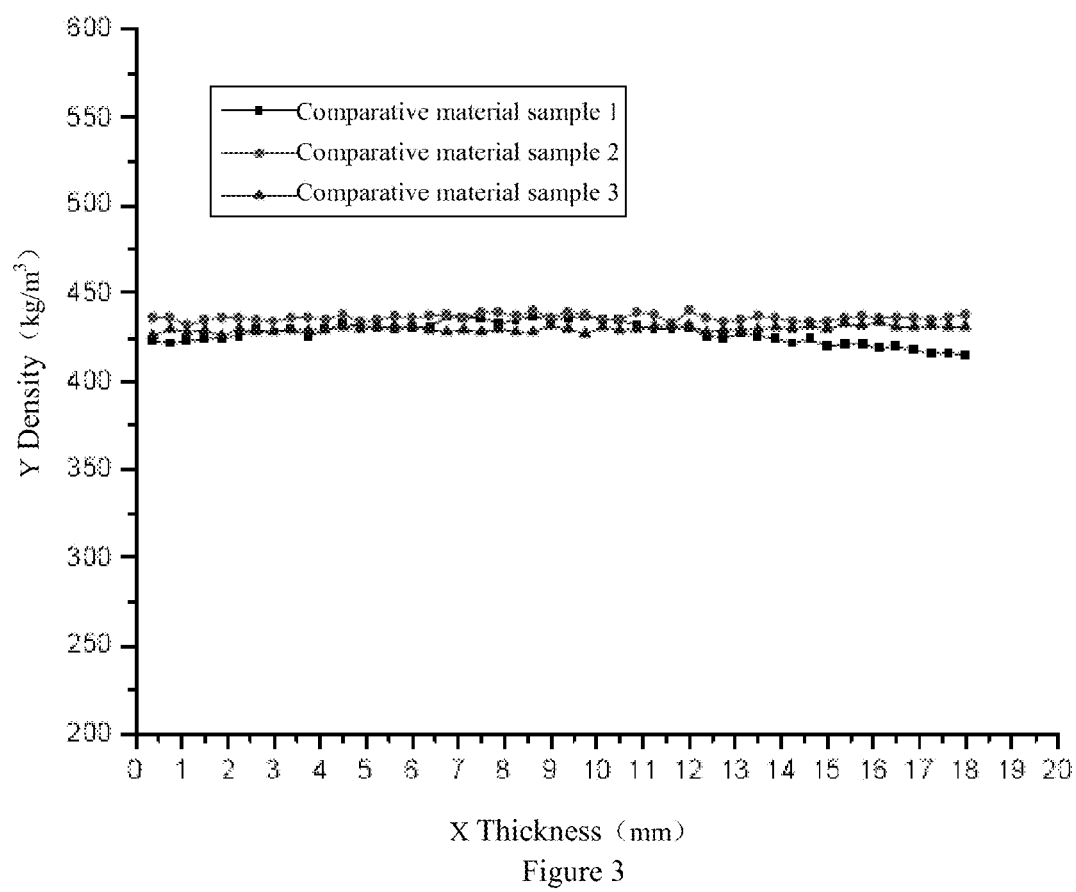
FIG. 3 shows the density distribution of cottonwood source material along the thickness direction described in embodiment 2.
Figure 4:
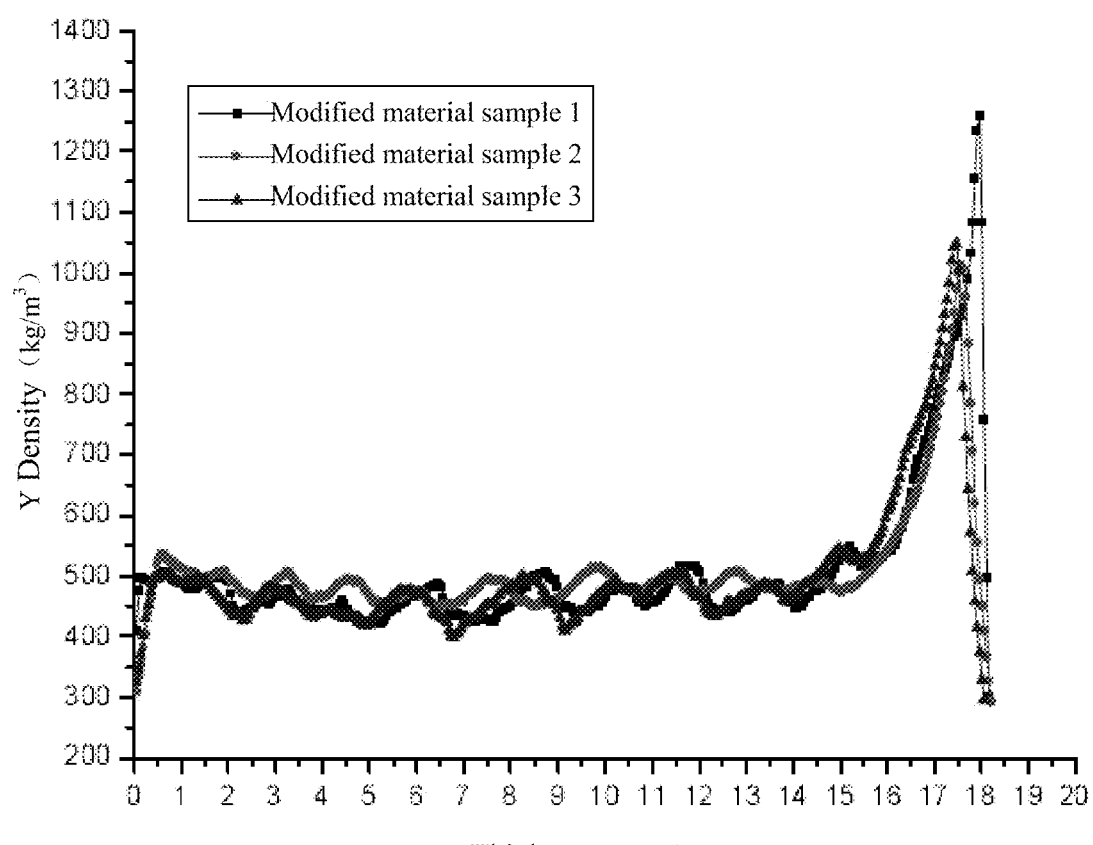
FIG. 4 shows the density distribution of compressed and carbonized cottonwood source material along the thickness direction described in embodiment 2.

The manufacturing method for a kind of southern pine floor board uses fast-growing trees as the source material of the solid wood. After they are cut with the same size and piled in order, use forklift to transfer them to a steam type drying kiln with top ventilation. Control the moisture content within 8 to 12%. Use Weinig Unimat moulder U23EL to polish the wood surface after drying and select one side of the wood to be compressed (maintain the parallel between the polished surface and fiber). Put the polished wood with thickness of 25 mm into a three-layer hot press. The temperature difference between the hot press and the pressing board facing the surface to be compressed is 140° C. and the temperature difference between the hot press and the pressing board opposite the surface to be compressed is over 100° C. Control the pressing speed of the hot press at 4 mm/s. When the wood is compressed to 21 mm thick and pressure intensity at 25 MPa, stop compression and maintain or lower the temperature difference between the pressing boards for 30 min. Then release the pressure and cool the wood in the room temperature naturally. Put the cooled wood into a carbonization kiln with super hot steam. Pre-carbonize the wood under 135° C. and carbonize the wood under 170° C. for 3 hours.

Coating technology with high pressure roller: press low-viscosity resin into 0.1 mm compacted layer under 1 Mpa pressure. Reinforce the compacted layer again after UV solidification. These reinforced layers are helpful to isolate the external moisture from entering into the compacted layer; hence the wood stability is improved.

Moisture content adjustment: place the wood in a humidity control room for 3 to 5 days with relative humidity at 90% and temperature at 50° C. The wood moisture content should be 8 to 12% when they are removed. The final solid floor boards are made after sealing openings, polish and painting. The hardness, 2 mm from the surface of the compressed wood, is noticeably enhanced.

After carbonization, the boards have even yellow color on their surface and low moisture capacity. Their equilibrium moisture content remains at 8 to 12% and the paint film hardness is 2 H to 6 H for the compacted layer.

Embodiment 2

The manufacturing method for a kind of cottonwood floor board. Select the solid cottonwood as the source material. After they are cut with the same size and piled in order, use forklift to transfer them to a steam type drying kiln with top ventilation. Control the moisture content within 6 to 7%. Use Weinig Unimat moulder U23EL to polish the wood surface after drying and select one side of the wood to be compressed (maintain the parallel between the polished surface and fiber). Put the polished wood with thickness of 30 mm into a three-layer hot press. The temperature difference between the hot press and the pressing board facing the surface to be compressed is 200° C. and the temperature difference between the hot press and the pressing board opposite the surface to be compressed is over 130° C. Control the pressing speed of the hot press at 0.6 mm/s. When the wood is compressed to 24 mm thick and pressure intensity at 30 MPa, stop compression and maintain or lower the temperature difference between the pressing boards for 120 min. Then release the pressure and cool the wood in the room temperature naturally. Put the cooled wood into a carbonization jar with pressure. Pre-carbonize the wood under 135° C. and 0.15 to 0.3 Mpa for 3 hours and carbonize the wood under 180° C. for 3 hours. Adjust the wood moisture content to 6 to 10% after they are cooled down.

Place the wood in room temperature for some time. The final solid floor boards are made after sealing openings, polish and painting. From the FIG. 1 of the slitting electric mirror of the compacted layer in this embodiment, the fiber gaps are almost removed after compression. Therefore the boards have high hardness and are able to meet the strength requirements of various boards. As the boards' natural layer has loose fiber structure, they are more comfortable and excellent to absorb sound and prevent vibration, like soft wood.

Coating technology with high pressure roller: press low-viscosity resin into 0.15 mm of the compacted layer under 0.5 Mpa pressure. Reinforce the compacted layer again after UV solidification. These reinforced layers are helpful to isolate the external moisture from entering into the compacted layer; hence the wood stability is improved.

The hardness, 2.5 mm from the surface of the compressed wood, is noticeably enhanced. As the fiber gaps of the compacted layer are almost removed, the boards have high hardness and are able to meet the strength requirements of various boards. As the boards' natural layer has loose fiber structure, they are more comfortable and excellent to absorb sound and prevent vibration, like fast-growing timbers. The paint film hardness of the compacted layer is 2 H to 6 H.

The differences between embodiment 3 to 5 and embodiment 1 are shown in the TABLE 1:

TABLE 1

| Items | Embodiment 1 | Embodiment 2 | Embodiment 3 | Embodiment 4 | Embodiment 5 |
|---|---|---|---|---|---|
| Source material | Southern pine | Cottonwood | Fir | Masson pine | Paulownia |
| Hot press | 25 Mpa | 30 Mpa | 50 Mpa | 40 Mpa | 35 Mpa |
| Hot pressing board temperature | 140° C. | 200° C. | 170° C. | 150° C. | 190° C. |
| Pressing distance | 4 mm | 6 mm | 6 mm | 3 mm | 2 mm |
| Compacted layer thickness | 3 mm | 4 mm | 4 mm | 2 mm | 0.6 mm |
| Temperature and pressure duration after compression | 30 min | 120 min | 60 min | 80 min | 100 min |
| Pre-carbonization temperature | 135° C. | 135° C. | 140° C. | 125° C. | 150° C. |
| Pre-carbonization duration | 4 hrs | 3 hrs | 2 hrs | 2 hrs | 1 h |
| Carbonization temperature | 170° C. | 180° C. | 190° C. | 210° C. | 230° C. |
| Carbonization duration | 3 hrs | 3 hrs | 2 hrs | 5 hrs | 1 h |
| Carbonization type | carbonization kiln | carbonization jar | carbonization jar | carbonization kiln | carbonization jar |
| Moisture content | 8 to 12% | 6 to 10% | 5 to 7% | 6 to 9% | 5 to 8% |
| UV coating pressure | 1 Mpa | 0.5 Mpa | 0.6 Mpa | 0.7 Mpa | 0.8 Mpa |
| Compacted layer thickness | 0.1 mm | 0.15 mm | 0.1 mm | 0.05 mm | 0.07 mm |
| Surface paint film hardness | 2H to 6H | 2H to 6H | 2H to 6H | 2H to 5H | 2H to 4H |
| Total density | 500 to 720 Kg/M$^3$ | 380 to 550 Kg/M$^3$ | 380 to 550 Kg/M$^3$ | 500 to 680 Kg/M$^3$ | 400 to 600 Kg/M$^3$ |
| Source material density | 450 to 620 Kg/M$^3$ | 350 to 450 Kg/M$^3$ | 320 to 420 Kg/M$^3$ | 480 to 600 Kg/M$^3$ | 300 to 400 Kg/M$^3$ |
| Compacted layer density | 480 to 1350 Kg/M$^3$ | 480 to 1200 Kg/M$^3$ | 400 to 1100 Kg/M$^3$ | 550 to 1350 Kg/M$^3$ | 450 to 1000 Kg/M$^3$ |
| Corrosion resistance grade | >II | >II | >II | >II | >II |
| Weight loss | ≦10% | ≦15% | ≦12% | ≦14% | ≦8% |

We claim:

1. A method for making a surface-reinforced solid wood section material comprising:

drying wood having a density less than 700 kg/m$^3$ until the moisture content is between 5% and 12%;

compressing the dried wood by employing a hot press with upper and lower pressing boards having different first temperatures on the surface of the wood under constant pressure of between 25 Mpa and 50 Mpa and wherein the temperature of the pressing board having the first higher temperature is between 140° C. and 200° C. and the temperature of the pressing board having the first lower temperature is 100° C. lower than the pressing board having the first higher temperatures;

reducing the temperature difference between the upper and lower pressing boards and maintaining the reduced temperature difference and pressure for between 30 minutes and 180 minutes after compressing the dried wood surface;

pre-carbonizing the wood at a temperature less than 150° C. for a time between 1 and 4 hours; and carbonizing the wood.

2. The method according to claim 1, wherein the carbonization step comprises applying a heat treatment to the dried wood at a temperature between 170° C. and 230° C. for a time between 1 to 5 hours.

3. The method according to claim 1, wherein the pre-carbonizing occurs after compressing the dried wood and before carbonizing the wood for preventing defects during the step of carbonizing the wood.

4. The method according to claim 1, further comprising a moisture content adjustment to between 5% and 12% after carbonization.

5. A method for making a surface-reinforced solid wood section material comprising:

drying wood having a density less than 700 kg/m$^3$ until the moisture content is between 5% and 12%;

compressing the wood using a hot press to compress the wood, the hot press comprising an upper pressing board having a first temperature and a lower pressing board having a first temperature under constant pressure of between 25 Mpa and 50 Mpa, wherein the temperature of the pressing board having the first higher temperature is between 140° C. and 200° C. and the temperature of the pressing board having the first lower temperature is 100° C. lower than the pressing board having the first higher temperature;

reducing the temperature difference between the upper pressing board and the lower pressing board;

maintaining the reduced temperature difference and pressure for between 30 minutes and 180 minutes after compressing the wood; and carbonizing the wood.

6. The method according to claim 5, wherein the wood is one of fir, masson pine, larch, cottonwood, and paulownia.

7. The method according to claim 5, wherein carbonizing the wood comprises applying a heat treatment to the wood at a temperature between 170° C. and 230° C. for a time between 1 to 5 hours.

8. The method according to claim 1, wherein the wood is one of fir, masson pine, larch, cottonwood, and paulownia.

9. A method for making a surface-reinforced solid wood section material comprising:

drying wood having a density less than 700 kg/m$^3$ until the moisture content is between 5% and 12%;

compressing the dried wood using a hot press to compress the wood, the hot press comprising an upper pressing board having a first temperature and a lower pressing board having a first temperature under constant pressure of between 25 Mpa and 50 Mpa, wherein the temperature of the pressing board having the first higher temperature is between 140° C. and 200° C. and the temperature of the pressing board having the first lower temperature is 100° C. lower than the pressing board having the first higher temperature;

after the step of compressing the dried wood, pre-carbonizing the wood at a temperature less than 150° C. for a time between 1 hour and 4 hours for preventing defects of the wood during the step of carbonizing the wood; and carbonizing the wood by applying a heat treatment thereto at a temperature between 170° C. and 230° C. for a time between 1 to 5 hours.

* * * * *